(12) United States Patent
Schmotzer et al.

(10) Patent No.: US 6,604,538 B2
(45) Date of Patent: Aug. 12, 2003

(54) ADJUSTABLE FLUID FLOW REGULATOR WITH ADJUSTMENT LIMIT

(75) Inventors: John A. Schmotzer, St. Louis, MO (US); Wilfred G. Soutiea, St. Louis, MO (US); John J. Love, St. Louis, MO (US); Mike C. Santinanavat, Chesterfield, MO (US)

(73) Assignee: Emerson Electric Co., St. Louis, MO (US)

( * ) Notice: Subject to any disclaimer, the term of this patent is extended or adjusted under 35 U.S.C. 154(b) by 102 days.

(21) Appl. No.: 09/895,669

(22) Filed: Jul. 2, 2001

(65) Prior Publication Data

US 2003/0000579 A1 Jan. 2, 2003

(51) Int. Cl.$^7$ ................................................. G05D 7/03
(52) U.S. Cl. ......................... 137/1; 137/66; 137/489; 137/492.5; 137/269; 137/505.41; 251/337
(58) Field of Search .......................... 137/1, 66, 488, 137/489, 492.5, 269, 271, 505, 505.41; 251/61.1, 331, 337; 267/177

(56) References Cited

U.S. PATENT DOCUMENTS

| | | | | |
|---|---|---|---|---|
| 2,746,471 A | * | 5/1956 | Cobb | 251/331 |
| 3,053,499 A | * | 9/1962 | Jones | 251/337 |
| 3,062,525 A | * | 11/1962 | Schutmaat | 251/337 |
| 3,159,388 A | * | 12/1964 | Wall | 267/123 |
| 3,405,927 A | * | 10/1968 | Drabik et al. | 267/175 |
| 3,451,421 A | * | 6/1969 | Vicenzi et al. | 137/495 |
| 3,603,214 A | * | 9/1971 | Murrell | 267/177 |
| 3,747,629 A | | 7/1973 | Bauman | |
| 3,776,268 A | * | 12/1973 | Visos et al. | 137/489 |
| 3,938,542 A | * | 2/1976 | Bolha | 137/271 |
| 4,637,429 A | * | 1/1987 | Dietiker et al. | 137/505.14 |
| 4,718,448 A | | 1/1988 | Love et al. | |
| 5,000,222 A | * | 3/1991 | Moenkhaus et al. | 267/177 |
| 5,285,813 A | * | 2/1994 | Quante et al. | 251/337 |
| 5,435,343 A | | 7/1995 | Buezis | |
| 5,988,204 A | * | 11/1999 | Reinhardt et al. | 251/337 |
| 6,170,507 B1 | | 1/2001 | Dalton et al. | |

* cited by examiner

Primary Examiner—Michael Powell Buiz
Assistant Examiner—Ramesh Krishnamurthy
(74) Attorney, Agent, or Firm—Kevin Punam

(57) ABSTRACT

An improved adjustable fluid flow regulator having a regulator chamber, a moveable diaphragm within the regulator chamber, a spring that acts upon the diaphragm to regulate the flow of fluid, and a first adjustment member and second adjustment member for adjustably biasing the spring against the diaphragm. The improvement includes a tamper resistant feature for restricting adjustment above a predetermined limit. The first adjustment member is fully adjusted to a limit. The second adjustment member is adjusted to bias the spring to a predetermined maximum setting, and restricted from further adjustment. The first adjustment member would subsequently be adjustable to any setting up to the predetermined limit.

8 Claims, 2 Drawing Sheets

US 6,604,538 B2

ADJUSTABLE FLUID FLOW REGULATOR WITH ADJUSTMENT LIMIT

FIELD OF THE INVENTION

This invention relates to an adjustable fluid flow regulator, and in particular to an adjustable fluid flow regulator having a finite adjustment limit.

BACKGROUND OF THE INVENTION

Commercial and Residential gas appliances typically use natural gas or L. P. gas, which are delivered at different pressures. It is desirable to have equipment that can be converted for use with either type of gas, rather than equipment limited in use to just one type of gas. A number of attempts have been made to make an adjustable pressure regulator that is capable of operating within the pressure ranges typical for the two types of gas. Examples of these include Bauman, U.S. Pat. No. 3,747,629; Love, U.S. Pat. No. 4,718,448; Buezis, U.S. Pat. No. 5,435,343; Dalton, U.S. Pat. No. 6,173,775. Most of these devices employ a diaphragm for controlling a valve, a spring for biasing the diaphragm, and a means for varying the spring pressure to adjust the fluid flow regulator.

While the prior adjustable fluid flow regulators are useful for the purposes described, there is still a need to reduce the risk of inadvertent adjustment above the pressure ranges typical for natural gas and L. P. gas, or the specified maximum pressures of the appliance manufacturer.

SUMMARY OF THE INVENTION

The present invention relates to an adjustable fluid flow regulator construction that can be converted between two modes of operation, but which restricts accidental or inadvertent adjustment above a predetermined maximum limit. The regulator of the present invention comprises a casing having an inlet and an outlet, a diaphragm-operated valve, and a servo-regulator diaphragm. The servo-regulator diaphragm regulates the passage of a control gas pressure that is applied to one side of the diaphragm that operates the valve. The valve opens and closes as the diaphragm moves in response to pressure changes on either side of the diaphragm. By adjusting the servo-regulator diaphragm, the control gas pressure can be adjusted to control the opening of the valve.

The adjustable fluid flow regulator further comprises a spring for applying pressure against the servo-regulator diaphragm to control the operation of the valve. A first screw and a second screw are both used to adjustably bias the spring against the servo-regulator diaphragm. The second screw, which engages the spring, is adjustably disposed within the first screw. Initially adjusting the regulator involves fully adjusting the first screw to a limit within the regulator, and subsequently adjusting the second screw until the predetermined maximum regulator setting is obtained. Once the maximum setting adjustment is made, the second screw may be restricted from further adjustment in the field by using a non-standard screw head not adjustable by the public, or by a means of covering the screw. Subsequent adjustment would be limited to the first screw and would not exceed the maximum regulator setting established by the limit.

DETAILED DESCRIPTION OF THE PREFERRED EMBODIMENTS

Figure 1:
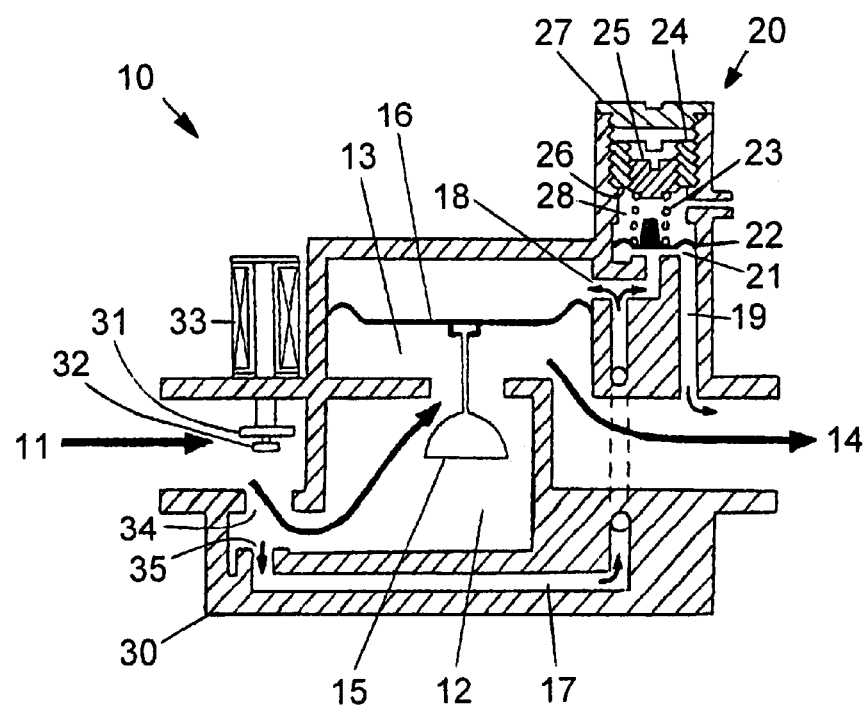
FIG. 1 is a cross-sectional view of a gas valve unit incorporating an adjustable fluid flow regulator according to the principles of the present invention.

The gas valve unit incorporating an adjustable fluid flow regulator according to the principles of this invention is indicated generally at 10 in FIG. 1. The gas valve unit 10 is of the type that might be incorporated into a gas furnace, gas boiler, or a gas water heater to provide gas to the burner. The gas valve unit of the present invention typically operates with an inlet pressure range of 7 to 14 inches of water column. However, the adjustable fluid flow regulator of the present invention is not so limited, and can be incorporated into devices for distributing gas to other gas applications.

The gas valve unit comprises a casing 30 having an inlet 11 and an outlet 14, a valve chamber 12 and a diaphragm chamber 13 disposed in the casing respectively between the inlet 11 and the outlet 14, and a servo-diaphragm chamber 21 disposed in the casing. A poppet valve 15 in the valve chamber 12 controls fluid flow through a passage between the valve chamber 12 and the diaphragm chamber 13. The poppet valve thereby controls fluid flow from the inlet 11 through the valve chamber 12 through the diaphragm chamber 13 and to the outlet 14. A flexible main diaphragm 16, connected to the poppet valve 15, opens and closes the passage to the diaphragm chamber 13 in response to pressure changes on either side of the main diaphragm. The main diaphragm 16 thereby regulates fluid flow into the diaphragm chamber 13 and to the outlet 14. A first control passage 17 extends from the valve chamber 12 to the side of the main diaphragm 18 opposite the diaphragm chamber, and also extends to the servo-diaphragm chamber 21. The control passage 17 allows a control gas pressure to be applied against the main diaphragm at 18 to open the poppet valve 15. A second control passage 19 allows the passage of the control gas pressure from the servo-diaphragm chamber 21 to the gas valve exit 14. The servo-diaphragm 22 can regulate the opening of the second control passage 19, thereby regulating the amount of control gas pressure in the first control passage 17. Regulating the control gas pressure will operate the diaphragm 16 to regulate the outlet gas pressure of the gas valve unit.

The gas valve unit 10 also comprises valve members 31 and 32 for closing against valve chamber openings 34 and 35, respectively. The valve members 31 and 32 are held in a closed position by valve springs (not shown), and are opened by a solenoid 33, to allow the gas valve unit 10 to provide gas flow to the regulator.

The adjustable regulator section 20 of the gas valve unit 10 comprises a spring 23 for selectively applying biasing pressure against the servo-diaphragm 22, and a means of adjusting the spring pressure comprising a first adjustment member 24 and a second adjustment member 25. The second adjustment member 25 is preferably a screw, and is adjustably disposed within the first adjustment member 24. The first adjustment member 24 is preferably a screw, and is adjustable relative to the regulator chamber 28. The first adjustment screw 24 is fully adjusted until it seats against a limit 26 in the regulator chamber. The second screw 25 engages the spring 23, and is adjusted to the predetermined maximum regulator setting for natural gas, at approximately 3.8 inches of water column. Subsequently the first screw 24 is backed off from its fully adjusted position to the nominal regulator setting, at approximately 3.5 inches of water column. Once the adjustments are complete, the opening in the first screw that provides access to the second screw could be covered or plugged to restrict further adjustment of the second screw. A protective cap 27 may optionally be installed to cover the screws 24 and 25.

Conversion from natural gas to L. P. gas involves removing the cap 27, removing the first screw 24 without altering the second screw 25, and replacing the natural gas spring 23 with a corresponding L. P. gas conversion spring (not shown). The first screw 24 is reinstalled, with no adjustment made to the second screw 25. Adjustments to the regulator setting would be limited to adjusting the first screw only. The L. P. gas conversion spring is configured so that it will not bias the diaphragm above the predetermined maximum regulator setting for L. P. gas of 11.5 inches of water column when the first screw is fully adjusted to limit 26. Other conditions, however, may affect the regulator setting.

Figure 2:
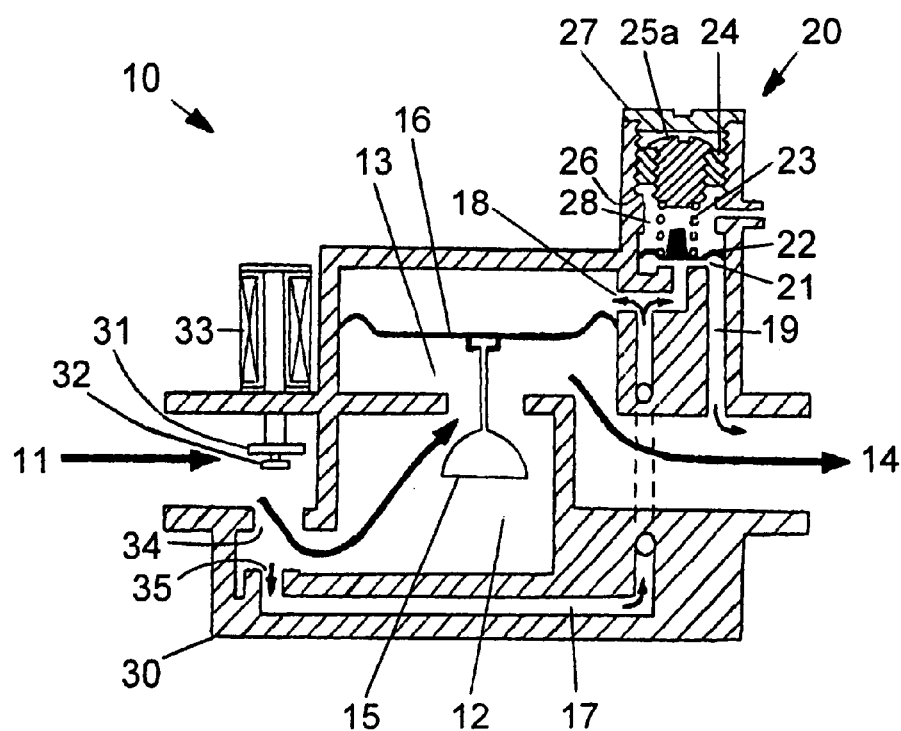
FIG. 2 is a cross-sectional view of an alternated embodiment of an adjustable fluid flow regulator according to the principles of the present invention.

It should be understood that different modifications to the first adjustment screw or the second adjustment screw could yield alternate embodiments that would achieve the same result. In one such embodiment (FIG. 2), a second screw 25a modified to include a screw head is fully assembled into the first screw 24, and is engaged with the spring. The first screw 24 is then adjusted relative to the regulator chamber to the predetermined maximum regulator setting, and subsequently restricted from further adjustment. All regulator settings would then be limited to the modified second adjustment screw, which could not be adjusted beyond the predetermined maximum regulator setting of the first screw. The second screw could also be removed to allow replacement of spring 23 with a corresponding L. P. gas conversion spring.

Those skilled in the art will recognize that the inventive adjustable regulator limit of this invention may be useful in many applications and for control of many different types of fluids, and are especially useful for control of gaseous fuel flow. Inasmuch as many modifications within the spirit of the invention will be apparent to those skilled in the art, the scope of the invention should be determined by reference to the claims appended below and the full scope of equivalents as provided by applicable laws.

What is claimed is:

1. An adjustable fluid flow regulator having a regulator chamber, a moveable diaphragm therein, and a spring that acts upon the diaphragm to regulate the flow of fluid through the regulator, the improvement comprising:

a first adjustment member for adjustably biasing the spring against the diaphragm, wherein the first adjustment member is adjustable relative to the regulator chamber; and a second adjustment member for adjustably biasing the spring against the diaphragm, wherein the second adjustment member is adjustable relative to the first adjustment member and is configured to engage the spring; and a stop within the regulator chamber for limiting the adjustment range of the first adjustment member.

2. The adjustable fluid flow regulator according to claim 1 wherein the spring is configured to regulate the fluid flow up to a first predetermined maximum pressure, and is interchangeable with a replacement spring configured to regulate the fluid flow up to a second predetermined maximum pressure.

3. The adjustable fluid flow regulator according to claim 1, wherein the second adjustment member comprises an externally threaded portion, a shoulder for engaging the spring, and an end having a means for enabling axial rotation and the first adjustment member comprises an externally threaded portion, ran internally threaded portion, and an end having a means for enabling axial rotation, the first adjustment member further comprising a plug insertable into the internally threaded portion of said first adjustment member for restricting access to said second adjustment member.

4. A method of adjusting a fluid flow regulator of the type having a regulator chamber, a moveable diaphragm, a spring that acts upon the diaphragm to regulate the flow through the regulator, and a first adjustment member having a second adjustment member disposed therein for adjustably biasing the spring against the diaphragm, the method comprising the steps of adjusting the first adjustment member to a fully adjusted position;

adjusting the second adjustment member to bias the spring to a predetermined maximum regulator setting; and re-adjusting the first adjustment member away from its fully adjusted position to bias the spring to a desired nominal regulator setting.

5. The method according to claim 4 further including the step of restricting the adjustment of the second adjustment member.

6. A method of adjusting a fluid flow regulator of the type having a regulator chamber, a moveable diaphragm, a spring that acts upon the diaphragm to regulate the flow through the regulator, and a first adjustment member having a second adjustment member disposed therein for adjustably biasing the spring against the diaphragm, the method comprising the steps of adjusting the second adjustment member to a fully adjusted position;

adjusting the first adjustment member to bias the spring to a predetermined maximum regulator setting; and subsequently re-adjusting the second adjustment member away from its fully adjusted position to bias the spring to a desired nominal regulator setting.

7. The method according to claim 6 further including the step of restricting the adjustment of the first adjustment member.

8. The method of adjusting from a first operating pressure to a second operating pressure for an adjustable fluid flow regulator of the type having a regulator chamber, a moveable diaphragm, a spring that acts upon the diaphragm to regulate the flow through the regulator, and a first adjustment member having a second adjustment member disposed therein for adjustably biasing the spring against the diaphragm, the method comprising the steps of removing the first adjustment member from the regulator chamber without altering the second adjustment member;

removing the spring corresponding to a first operating pressure;

inserting an interchangeable spring corresponding to a second operating pressure;

replacing the first adjustment member; and adjusting the first adjustment member to bias the spring to a desired regulator setting.

* * * * *